US009788160B1

(12) United States Patent
Gu et al.

(10) Patent No.: US 9,788,160 B1
(45) Date of Patent: Oct. 10, 2017

(54) DYNAMIC LOCATION TRACKING

(71) Applicant: Symantec Corporation, Mountain View, CA (US)

(72) Inventors: Lei Gu, Bedford, MA (US); Abhilash Raipally, Chennai (IN); Dinesh Ramaswamy Ganesh, Chennai (IN); Andrew Davis Emerson, Chennai (IN); Anand Elumalai, Chennai (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 15/469,390

(22) Filed: Mar. 24, 2017

(51) Int. Cl.
*H04W 24/00* (2009.01)
*H04W 4/02* (2009.01)

(52) U.S. Cl.
CPC .................................. *H04W 4/021* (2013.01)

(58) Field of Classification Search
CPC ....... H04W 4/021; H04W 4/02; H04W 24/00; H04W 4/028; H04W 64/006; H04W 48/16; H04W 1/06; H04W 12/06; H04W 12/12; G01S 19/40; G01S 5/0263; G08B 21/0288; G08B 21/0277; G08B 21/0283; G06F 2221/2111; G06F 21/62
USPC ..................................................... 455/456.1
See application file for complete search history.

(56) References Cited

U.S. PATENT DOCUMENTS

| | | | | |
|---|---|---|---|---|
| 6,785,551 B1* | 8/2004 | Richard | ................. | H04W 4/02 340/995.24 |
| 7,493,211 B2* | 2/2009 | Breen | ................... | G01S 5/0027 340/995.12 |
| 7,498,985 B1* | 3/2009 | Woo | ....................... | G01S 19/258 342/357.64 |
| 7,639,131 B2* | 12/2009 | Mock | .................... | G01S 5/0205 340/539.11 |
| 7,705,728 B2* | 4/2010 | Mock | .................... | G01S 5/0294 340/539.13 |
| 8,169,342 B1* | 5/2012 | Barbeau | ................. | G01C 21/20 340/539.11 |
| 8,229,473 B1* | 7/2012 | De La Rue | ........... | H04W 4/021 340/539.13 |
| 8,542,097 B2* | 9/2013 | Ross | ....................... | H04L 67/18 340/5.1 |
| 8,812,024 B2* | 8/2014 | Obermeyer | ........ | G08B 21/0277 455/404.2 |
| 8,856,916 B1* | 10/2014 | Sobel | ...................... | G06F 21/62 726/17 |
| 8,977,288 B2* | 3/2015 | Abraham | .............. | H04W 24/00 455/456.1 |
| 9,078,098 B1* | 7/2015 | Cronin | ................... | H04W 4/021 |
| 9,167,381 B2* | 10/2015 | McDonald | ............ | H04W 4/021 |

(Continued)

*Primary Examiner* — Mahendra Patel
(74) *Attorney, Agent, or Firm* — Patent Law Works LLP

(57) ABSTRACT

Dynamic location tracking may be performed by a mobile app executing on a mobile computing device. A first geo-fence of a predefined size is set on a mobile operating system of a mobile computing device to notify a mobile app when the first geo-fence is crossed by the mobile computing device. The notification occurs even when the mobile app is suspended or not running. Notification is received from the mobile operating system that the mobile computing device has crossed the first geo-fence. A location of the mobile computing device is received. A second geo-fence is set on a mobile operating system of the mobile computing device based on the location of the mobile computing device.

18 Claims, 7 Drawing Sheets

(56) References Cited

U.S. PATENT DOCUMENTS

| | | | | |
|---|---|---|---|---|
| 9,280,559 B1* | 3/2016 | Jones | ............... | H04L 61/1582 |
| 2003/0151501 A1* | 8/2003 | Teckchandani | ....... | B60R 25/102 |
| | | | | 340/426.19 |
| 2010/0124967 A1* | 5/2010 | Lutnick | ............... | G07F 17/32 |
| | | | | 463/17 |
| 2010/0127919 A1* | 5/2010 | Curran | ............... | H04W 4/021 |
| | | | | 340/573.4 |
| 2013/0178233 A1* | 7/2013 | McCoy | ............... | H04W 4/021 |
| | | | | 455/456.3 |
| 2013/0212065 A1* | 8/2013 | Rahnama | ......... | G06F 17/30002 |
| | | | | 707/609 |
| 2014/0028456 A1* | 1/2014 | Sadhu | ............... | G08B 21/18 |
| | | | | 340/539.13 |
| 2015/0081212 A1* | 3/2015 | Mitchell | ............ | G01C 21/367 |
| | | | | 701/454 |
| 2015/0180816 A1* | 6/2015 | Varoglu | ............... | H04L 51/24 |
| | | | | 709/206 |
| 2016/0009303 A1* | 1/2016 | Spahis | ............... | B61L 15/0018 |
| | | | | 701/19 |
| 2016/0078742 A1* | 3/2016 | Fernandez | ............ | G08B 21/18 |
| | | | | 340/686.6 |
| 2017/0070847 A1* | 3/2017 | Altman | ............... | H04H 60/90 |

* cited by examiner

DYNAMIC LOCATION TRACKING

TECHNICAL FIELD

This disclosure pertains generally to location tracking, and more specifically to location tracking on mobile computing devices.

BACKGROUND

It has become very common for children to have their own mobile computing devices such as smartphones and tablet computers. It is desirable that parents be able to supervise their children's use of computers in general and mobile devices specifically. Online safety is an ever present concern for parents, with common threats regarding Internet safety including cyber bullying, obscene and offensive content, pornography, hateful messages, and sexual predators or thieves luring children to unsafe locations. Children are naturally curious and may not always know when an online situation is unsafe. Fortunately, parental control software exists which allows the monitoring, filtering and blocking of content and apps that children attempt to download, view or otherwise access.

Parents would like to be able to allow their children to move about safely within approved locations (their own yards, neighborhoods, schools, friend's houses, etc.), while ensuring that they avoid prohibited or dangerous areas, and comply with specified time parameters or other condition (get to school on time, study at the library for at least two hours, be home by 8:00 PM, etc.).

Mobile operating systems, such as Apple Inc.'s iOS®, sometimes limit a mobile app's access to system level functionality. For example, Apple has severe restrictions under iOS® for allowing apps to run in the background, in an effort to improve user experience and extend battery life. Only special classes of apps approved by Apple are allowed to run the background, such as registered navigation apps which are allowed to receive location updates, or registered streaming apps (e.g., music players), which are allowed to download content from a server. Under iOS® other general-purpose applications are typically not allowed to keep running in the background, but instead are stopped or suspended when not in the foreground. Other mobile operating systems may have similar permission issues.

Thus, tracking a child's location continuously on mobile operating systems such as iOS® presents issues. For example, under iOS® a general purpose parental control app is limited by the mobile operating system from receiving location updates continuously. Because the parental control app typically would be classified as a general-purpose application, the mobile app would in general only be allowed to run in the foreground. When the mobile app is not being used actively, it will be suspended or terminated in due course. When suspended or terminated, the mobile app will be unable to obtain the current location of the mobile device or changes thereto from the mobile operating system. When the mobile app is terminated or suspended, the mobile app will be unable to continue tracking the location of the child by receiving continuous location updates.

It would be desirable to address these issues.

SUMMARY

A method for dynamically tracking location is implemented with a computing device, specifically with a mobile app executing on a mobile computing device. A first geo-fence of a predefined size is set on a mobile operating system of the mobile computing device to notify the mobile app when the first geo-fence is crossed by the mobile computing device. Notification is received from the mobile operating system that the mobile computing device has crossed the first geo-fence, even where the mobile app is suspended or not running. A location of the mobile computing device is received. A second geo-fence is set on a mobile operating system of the mobile computing device based on the location of the mobile computing device.

In some embodiments, the mobile operating system is iOS®. In some embodiments, prior to receiving notification from the mobile operating system the mobile app is stopped, terminated, suspended, or otherwise not running. In some embodiments, subsequent to setting a geo-fence the mobile app is woken up, relaunched, or started by the mobile operating system. In some embodiments, notification is received from the mobile operating system that the mobile computing device has crossed the second geo-fence, even where the mobile app is suspended or not running. In some embodiments, a second location of the mobile computing device is received. In some embodiments, a third geo-fence is set on a mobile operating system of the mobile computing device based on the second location of the mobile computing device. In some embodiments, notification is received from the mobile operating system that the mobile computing device has crossed the third geo-fence, even where the mobile app is suspended or not running. In some embodiments, a velocity of the mobile computing device is calculated based on a first time receiving a first location, and a second time receiving a second location. In some embodiments, a geo-fence size is determined based on the velocity. In some embodiments, a geo-fence is based on the geo-fence size. In some embodiments, a geo-fence size is determined based on a time of day. In some embodiments, a geo-fence size is determined based on a predefined place associated with the location of the mobile computing device. In some embodiments, a geo-fence size is determined based on a battery preservation setting. In some embodiments, a map is generated based on a plurality of locations of the mobile computing device over a period of time. In some embodiments, the map comprises a route and velocity indicator of the mobile computing device. In some embodiments, the map comprises a location and duration indicator of the mobile computing device. In some embodiments, an action taken by the mobile computing device is detected. In some embodiments, an alert message is sent to notify a responsible party based on the detected action. In some embodiments, parameters defining a geographical area are received from a map interface. In some embodiments, a static geo-fence associated with the geographical area on the mobile operating system is set to notify the mobile app when the static geo-fence is crossed by the mobile computing device. In some embodiments, notification is received from the mobile operating system that the mobile computing device has crossed the static geo-fence. In some embodiments, an alert message is sent to notify a responsible party such as a parent, to the party that the user of the device (e.g., the child) has crossed a given geo-fence or taken another action. In some embodiments, a plurality of historical locations of the mobile computing device over a period of time are stored. In some embodiments, patterns associated with the stored historical locations are determined. In some embodiments, one or more recent locations of the mobile computing device are received. In some embodiments, an anomaly is detected based on the one or more recent locations and the determined patterns of the mobile computing device.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1B:
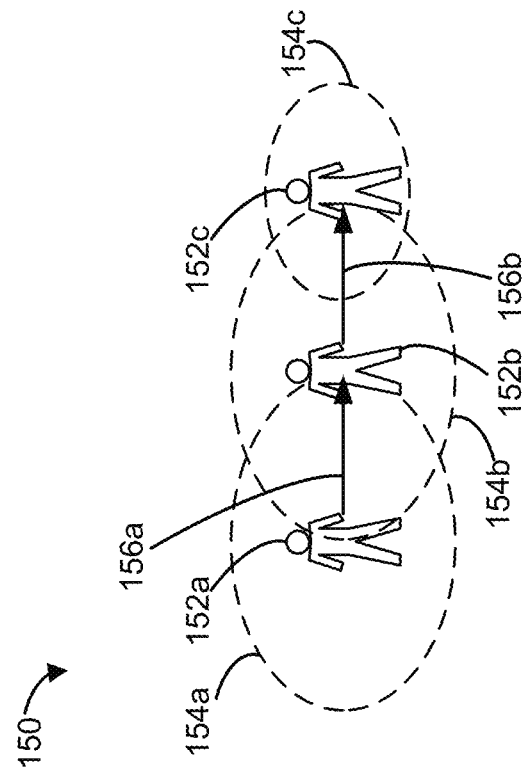
FIG. 1B is a schematic drawing of dynamic location tracking including a dynamically sized geo-fence, according to some embodiments.
Figure 1A:
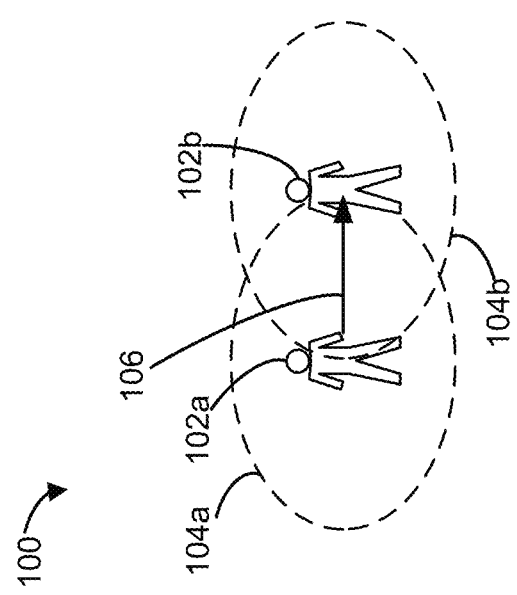
FIG. 1A is a schematic drawing of dynamic location tracking, according to some embodiments.

FIG. 1A is a schematic drawing 100 of dynamic location tracking. In the drawing 100, a user at a first location 102a has a first geo-fence 104a of a predefined size set on a mobile operating system of a mobile computing device that is associated with the user 102. For example, the user 102 may have a mobile computing device, such as a smart phone, generally in his pant pocket or in his hand. Thus, tracking the location of the mobile computing device may generally track the user 102. However, in some cases the mobile operating system on the mobile computing device may not allow a general-purpose mobile app to run in the background. In one embodiment, the mobile operating system may be iOS®.

With the first geo-fence 104a set, when the user 102 moves, as indicated by the arrow 106, from the first user position 102a to the second user position 102b, the user 102 crosses the first geo-fence 104a. When the first geo-fence 104a is crossed, a mobile app on the mobile computing device may be notified that the mobile computing device has crossed the first geo-fence 104a. For example, the mobile operating system may send a signal to the mobile app to notify the mobile app. In some embodiments, prior to receiving notification from the mobile operating system, the mobile app may be stopped or suspended. Having been notified, the mobile app may then receive the second location 102b of the mobile computing device and set a second geo-fence 104b based on the second location 102b.

FIG. 1B is a schematic drawing 150 of dynamic location tracking including a dynamically sized geo-fence. The drawing 150 is similar to drawing 100 in several respects. For example, the first user position 152a has a first geo-fence 154a set which is crossed when the user moves as indicated by the arrow 156a to the second user position 152b. In the second user position 152b, a second geo-fence 154b is set which the user crossed when the user moves as indicated by the arrow 156b. In the third user position 152c, the third geo-fence 154c may be dynamically adjusted. For example, a velocity of the mobile computing device may be calculated based on one or more of the movements 156. For instance, a first time received at the first user location 152a, and a second time receiving the second user location 152b may be used to calculate a velocity of the movement 156a.

In some embodiments, the third geo-fence 154c may be dynamically adjusted based on the calculated velocity. For example, the geo-fence size may be adjusted downward if the mobile computing device is moving more slowly (e.g., with a walking user). As another example, the geo-fence size may be adjusted upward if the mobile computing device is moving quicker (e.g., with a user in a vehicle). In some embodiments, a geo-fence size is determined based on a time of day. For example, during periods of sleep, the third geo-fence 154c may be set with a smaller radius that includes a user's residence. During school hours, the geo-fence may generally encompass a user's school. In other examples, the geo-fence size may be based on a detected location (e.g., a user's residence, school, library, home of a known friend, etc.).

In some embodiments, a geo-fence size is determined based on a battery preservation setting. For example, a user may wish to preserve the length of time between charging the mobile computing device's battery by instructing the mobile app to set large geo-fences so that the mobile app is not notified as often and thus the functionality of the global positioning system (GPS) on the mobile computing device is not invoked as often.

Figure 2:
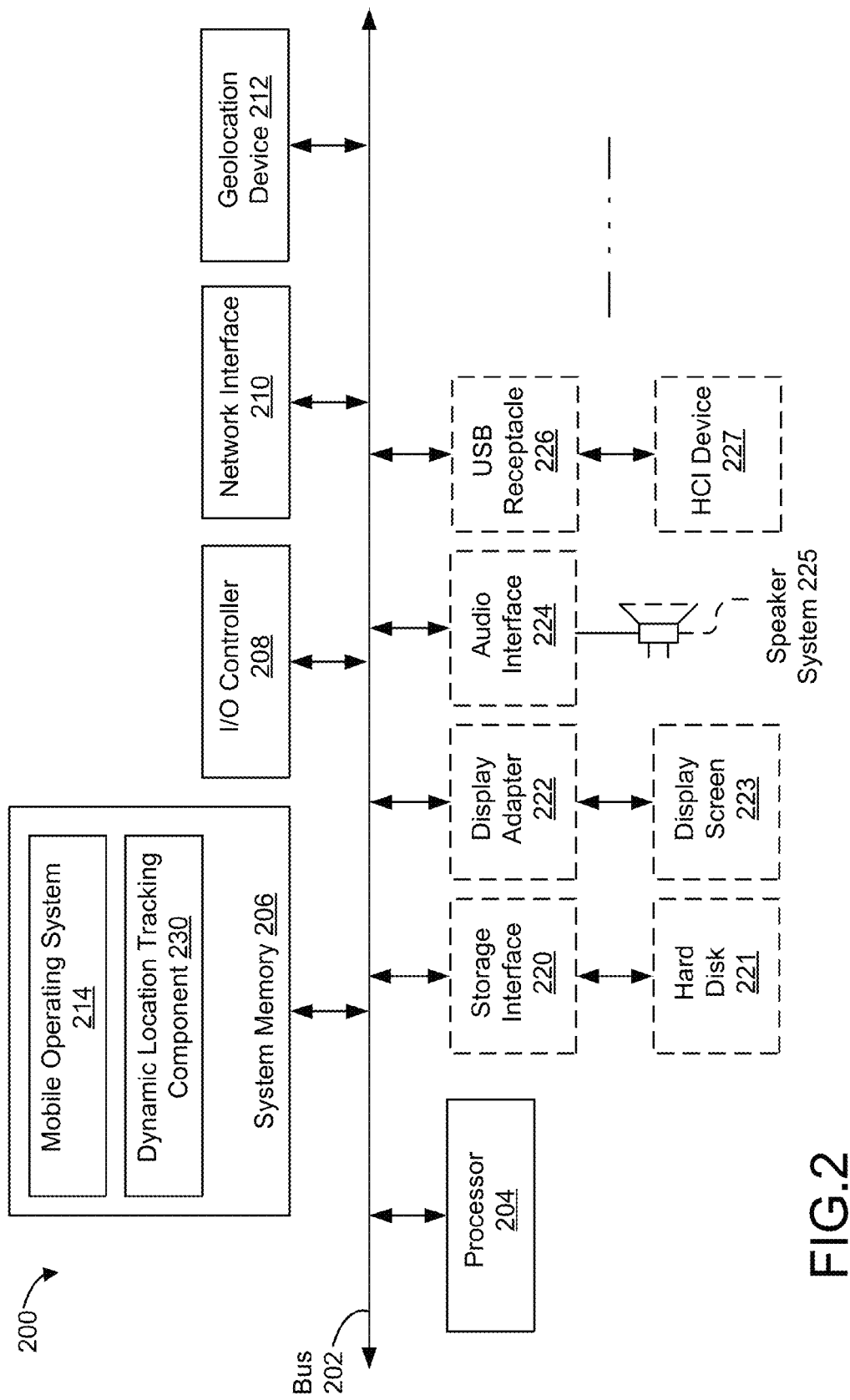
FIG. 2 is a block of a computer system suitable for implementing a dynamic location tracking component, according to some embodiments.

FIG. 2 is a block of a computer system 200 suitable for implementing a dynamic location tracking component. For example, the computer system 200 may be a mobile computing device such as a smartphone.

As illustrated, one component of the computer system 200 is a bus 202. The bus 202 communicatively couples other components of the computer system 200, such as at least one processor 204, system memory 206 (e.g., random access memory (RAM), read-only memory (ROM), flash memory), an input/output (I/O) controller 208, a network interface 210 and a geolocation device 212 (e.g., a GPS receiver). The network interface 210 may include a variety of protocols to connect to the local network and/or the Internet. For instance, the network may be a Bluetooth interface, a Universal Mobile Telecommunication System (UMTS) interface, a Long Term Evolution (LTE) interface, or an Institute of Electrical and Electronics Engineers' (IEEE) 802.11 wireless local area network (WLAN) or wireless Ethernet interface. In some embodiments, the computer system 200 may have multiple network interfaces that provide connectivity to several types of networks concurrently or non-concurrently. The bus 202 may also be communicatively coupled to other optional components such as a storage interface 220 communicatively coupled to one or more hard disk(s) 221 (or other form(s) of storage media), a display adapter 222 communicatively coupled to a video output device such as a display screen 223, an audio output interface 224 communicatively coupled to an audio output device such as a speaker 225, and one or more interfaces such as a universal serial bus (USB) receptacle 226 communicatively coupled to various peripherals such as human-computer interaction (HCI) devices (e.g. keyboard, mice, sensors, etc.).

The bus 202 allows data communication between the processor 204 and system memory 206, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 221, flash memory, ROM, etc.) and loaded into system memory 206 and executed by the processor 204. Application programs can also be loaded into system memory 206 from a remote location (i.e., a remotely located server 110), for example via the network interface 210. In FIG. 2, a dynamic location tracking component 230 is illustrated as residing in system memory 206. The workings of the dynamic location tracking component 230 are explained in greater detail below in conjunction with FIG. 3.

A mobile operating system 214 is also illustrated as residing in system memory 206. In one embodiment the mobile operating system 214 may be iOS®. The mobile operating system 214 may provide an interface between mobile apps and hardware of the computer system 200. For instance, the mobile operating system 214 may include drivers to control and receive data from the geolocation device 212. Further, the mobile operating system 214 may include an application programming interface (API) to provide location services. The mobile operating system 214 may also provide a common operating environment for mobile apps. In one embodiment, the mobile operating system 214 may stop or suspend mobile apps that have been executing in the background for a period of time. In one embodiment, the mobile operating system 214 may provide an API to set geo-fences and notify a mobile app when the geo-fence has been crossed by the computer system (e.g., based on the geolocation device 212). In one embodiment, the mobile operating system 214 may wake up or start a mobile app upon notifying the mobile app that a geo-fence has been crossed. The mobile app may then have a period of time to perform some functionality before the mobile operating system 214 stops or suspends the mobile app.

The storage interface 220 is coupled to one or more hard disks 221 (and/or other standard storage media). The hard disk(s) 221 may be a part of computer system 200, or may be physically separate and accessed through other interface systems.

Figure 3:
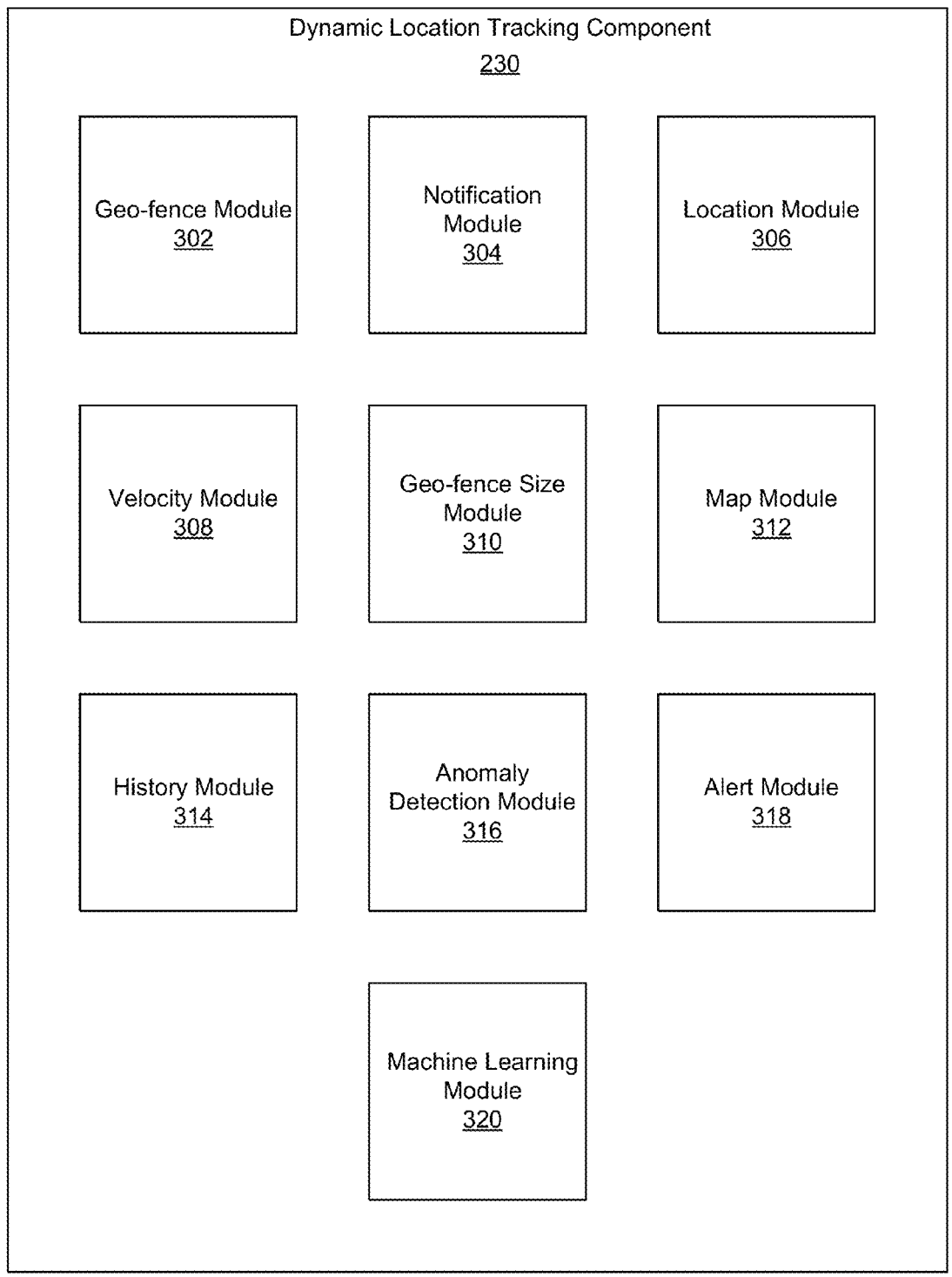
FIG. 3 is a block diagram of a dynamic location tracking component, according to some embodiments.
Figure 4:
FIG. 4 is a map associated with dynamic location tracking, according to some embodiments.
Figure 5:
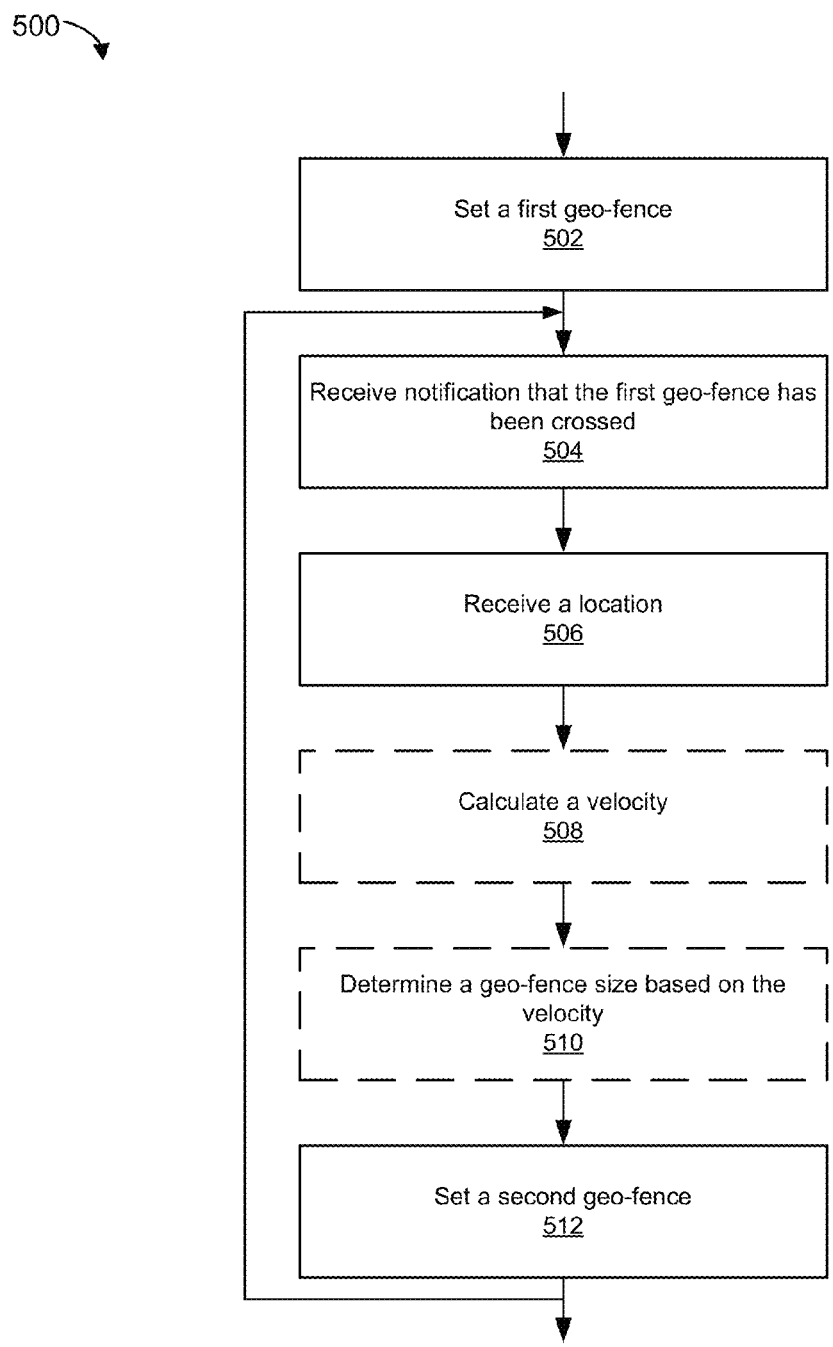
FIG. 5 is a flowchart of a method for dynamic location tracking, according to some embodiments.
Figure 6:
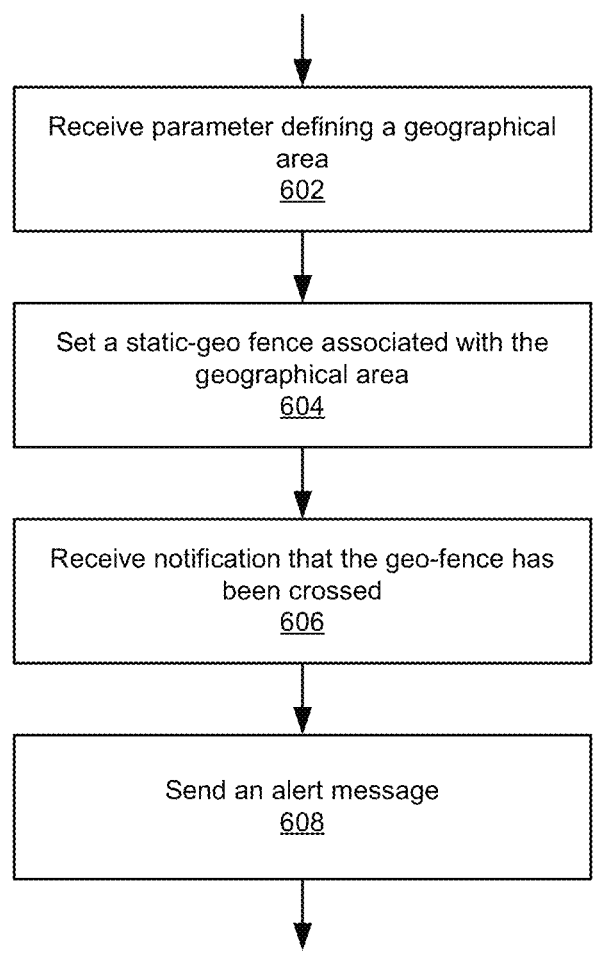
FIG. 6 is a flowchart of a method for creating a static geo-fence, according to some embodiments.
Figure 7:
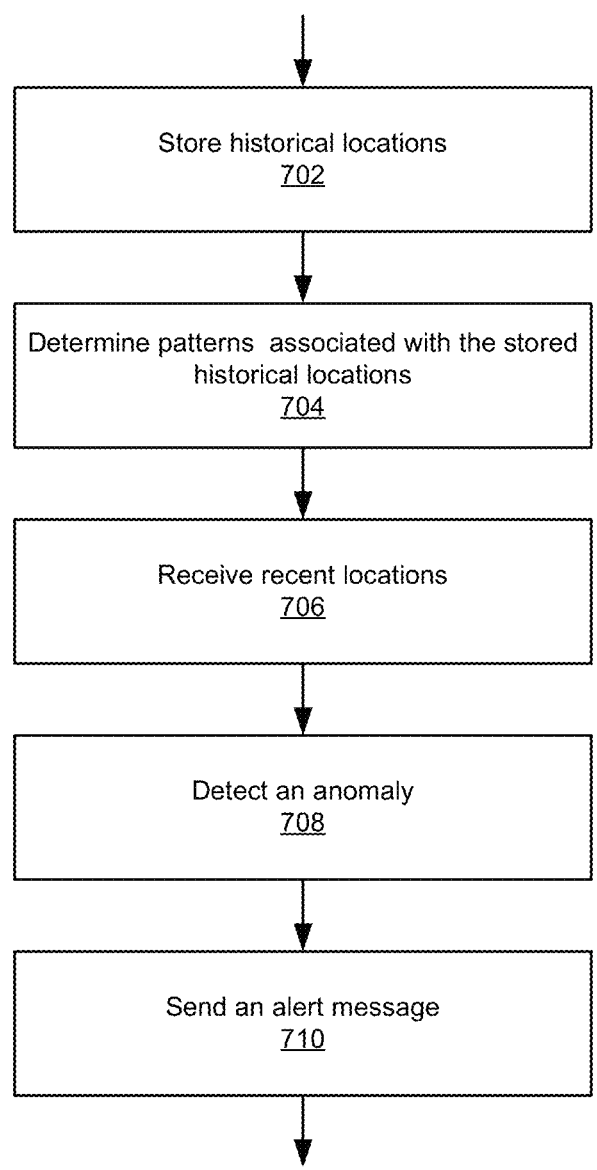
FIG. 7 is a flowchart of a method for determining location anomalies of a user of a mobile computing device, according to some embodiments.

FIG. 3 is a block diagram of the dynamic location tracking component 230. FIGS. 4-7 are also discussed below in conjunction with FIG. 3 as appropriate. In particular, FIG. 4 is a map 400 associated with dynamic location tracking, according to some embodiments. FIGS. 5-7 are flowcharts of various methods.

The dynamic location tracking component 230 may include various modules such as a geo-fence module 302, a notification module 304, a location module 306, a velocity module 308, a geo-fence size module 310, a map module 312, a history module 314, an anomaly detection module 316, an alert module 318, and a machine learning module 320. In some embodiments the dynamic location tracking component 230 is implemented as functionality within a general purpose parental control app that runs under a mobile operating system, such as iOS®. In other embodiments, the dynamic location tracking component 230 can be instantiated as part of a different app or program.

The geo-fence module 302 can set geo-fences. For example, the geo-fence module 302 may set 502 a geo-fence based on a current location of the computing device 200. The geo-fence may be set as a predefined size. For example, on iOS®, a general-purpose app can use the geo-fencing API to set a geo-fence with a specific center location and radius. The location of the mobile device 200 is then monitored by iOS®, and if the mobile computing device 200 crosses the geo-fence (either entering or exiting), iOS® delivers a notification to the mobile app, even if the mobile app is not running or is in a suspended state. For example, if the mobile app sets a geo-fence of 100 yards with the current location as the geo-center, the mobile app will be called back on when the device 200 moves 100 yards from the current location in a specific direction. If the mobile app is not running when the geo-fence is crossed, iOS® relaunches it to handle the event. Similarly, if the mobile app is suspended when the event occurs, iOS® wakes it up. Once running, the mobile app can now perform any type of task it wishes, including setting a new geo-fence, centering on the device's current location. By continuously setting new geo-fences based on the current location every time the device 200 crosses the old geo-fence boundary, the mobile app can track, monitor and update the device's location continuously, and hence the location of the child carrying the device 200, even when the mobile app is suspended or not running. If the suspended or inactive app does not receive any new notifications, then it is the case that the device 200 has not moved outside of the current geo-fence.

Thus, once the geo-fence module 302 has set up a geo-fence, the notification module 304 receives 504 a notification when the geo-fence is crossed. The notification module 304 may then request that the location module 306 receive 506 the current location of the computing device 200 (e.g., by using the iOS® standard location service, which is highly accurate, and which is now available to the location module 306 because the mobile app is now running). In some embodiments, the mobile app is woken up, relaunched, or started by the mobile operating system. For example, the mobile app may be relaunched into the background to handle the received notification 504. In some embodiments, the mobile app may be woken up and given a short amount of time (e.g., 10 seconds) to handle the received notification 504. In some examples, the notification module 304 may then instruct the geo-fence module 302 to set a new geo-fence based on the current location.

Note that general-purpose iOS® apps could use the "get significant-change location" API to provide periodic location notifications, but this is very inaccurate since it depends on WiFi and crowd sourcing of other phones, rather than the GPS. Thus, GPS-level accuracy for continuous location tracking cannot be obtained using the significant-change location service, whereas the geo-fencing embodiment provides GPS level accuracy.

In some cases, the notification module may invoke the velocity module 308 to calculate 508 a velocity of the computing device 200 and may instruct the geo-fence size module 310 to set a geo-fence of a particular size based on the velocity calculated by the velocity module 308. More specifically, as described above in conjunction with FIG. 1B, the velocity of the mobile computing device 200 may calculate velocity based on multiple received current locations of the device 200 and the times of receipt. The first time at which the first current location is received and the second time at which the second current location is received may be used to calculate the velocity of the mobile device 200. Thus, the geo-fence size module 310 may determine 510 a geo-fence size based on the velocity communicated to it by the velocity module 308. With the geo-fence size determined by the geo-fence size module 310, another geo-fence may be set 512 before the method 500 iterates through the next geo-fence to dynamically track a user's location. For example, the velocity module 308 can determine whether the user is in a motor vehicle or car, on a bicycle or walking, by measuring the time between the last two notifications and the geo-fence radius, and increase the geo-fence diameter accordingly. When the velocity module detects the device slowing down, the diameter can be decreased accordingly.

The map module 312 may receive 602 parameters defining a geographical area. For example, the map 400 may be used as part of a user interface. Through the user interface, the user may draw static geo-fences around areas of the map 400. For example, an area 420 may be particularly dangerous or problematic for children (e.g., high-speed traffic, criminal activity, drowning hazard, etc.). Another area 422 may be drawn on the map and additionally defined with dates and/or times in which the static geo-fence is active. The map module 312 may therefore set 604 a static geo-fence associated with the geographical area. With the static geo-fence set, the notification module 304 may receive 606 a notification when the geo-fence has been crossed and the alert module 318 may alert 608 a responsible user, such as an adult parent or guardian of a child user. In other embodiments, the alert module 318 can transmit alerts to the responsible party under other circumstances, such as providing the responsible party with regular updates concerning the child's current location. The alert module 318 can transmit alerts to responsible parties using any desired protocol, such as instant message, email, etc.

The history module 314 may store 702 historical locations. In some cases the history module 314 may communicate with the map module 312 to generate a map based on locations that the computing device 200 has been over a period of time. For example, the map 400 may include stops 402, 406, 408 and movements 404, 410. The movements 404, 410 may include route and velocity indicators. For example, the route indicator may be a directional arrow of where the mobile computing device moved from and to over a period of time. As another example, the amplitude or length of the arrow may indicate the velocity that the mobile computing device was traveling. For instance, the movements 404 may have been where the user was walking since the arrows are shorter, whereas the movements 410 may have been where the user was in a car since the arrows are longer. In some embodiments, velocity may be indicated by color (e.g., green fast, yellow slower, red very slow).

The stops 402, 406, 408 may include location and duration indicators. For example, placement of a dot, flag, or other indicator on the map 400 may indicate location. Duration may be indicated in a number of ways including the size or color of the placement indicator. For example, the location 402 may have a very large indicator notating that the user was there for a long period of time (e.g., home). As another example, the location 408 may have a very small indicator notating that the user was there for a short period of time (e.g., a hardware store). As yet another example, the location 406 may have a medium indicator notating that the user was there for an intermediate amount of time (e.g., school).

The machine learning module 320 may determine 704 patterns associated with the stored historical locations in the history module 314. Thus, the machine learning module 320 may communicate with the history module 314 to find relevant patterns. The location module 306 may then receive 706 recent locations of the mobile computing device and the anomaly detection module 316 may detect 708 an anomaly. For example, the anomaly detection module 316 may communicate with the machine learning module 320 to classify normal location data from anomalies in the location data. For instance, a child may regularly travel to and from school during specific times of the day. The machine learning module 320 may detect this such that when the child deviates from the normal and takes a different route home or leaves school at a different time, the anomaly detection module 316 may detect such a deviation and invoke the alert module 318 to alert a responsible party.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for dynamically tracking location, at least a portion of the method being performed by a computing device comprising at least one processor, the method comprising the steps of:

setting, with a mobile application ("app") executing on a mobile computing device, a first geo-fence of a first predefined size on a mobile operating system of the mobile computing device to notify the mobile app when the first geo-fence is crossed by the mobile computing device, even where the mobile app is suspended or not running, wherein the first predefined size comprises a center location and a radius, and is based on at least one of: a current velocity of the mobile computing device, a current time of day, a current battery preservation setting of the mobile computing device, and a current location of the mobile computing device;

receiving, with the mobile app executing on the mobile computing device, notification from the mobile operating system that the mobile computing device has crossed the first geo-fence, wherein prior to receiving notification from the mobile operating system the mobile app is stopped, terminated, suspended, or otherwise not running to preserve battery life on the mobile computing device;

receiving, with the mobile app executing on the mobile computing device, a location of the mobile computing device;

setting, with the mobile app executing on the mobile computing device, a second geo-fence of a second predefined size on the mobile operating system of the mobile computing device based on the received location of the mobile computing device, to notify the mobile app when the second geo-fence based on the received location is crossed by the mobile computing device, even where the mobile app is suspended or not running, wherein the second predefined size comprises a center location and a radius, and is based on at least one of: a current velocity of the mobile computing device, a current time of day, a current battery preservation setting of the mobile computing device, and a current location of the mobile computing device;

detecting, with the mobile app executing on the mobile computing device, an action taken with the mobile computing device; and sending, with the mobile app executing on the mobile computing device, an alert message to notify a responsible party based on the detected action.

2. The method of claim 1, wherein the mobile operating system is iOS.

3. The method of claim 1, wherein subsequent to setting a geo-fence the mobile app is woken up, relaunched, or started by the mobile operating system.

4. The method of claim 1, further comprising:
receiving, with the mobile app executing on the mobile computing device, notification from the mobile operating system that the mobile computing device has crossed the second geo-fence, even where the mobile app is suspended or not running;

receiving, with the mobile app executing on the mobile computing device, a second location of the mobile computing device; and setting, with the mobile app executing on the mobile computing device, a third geo-fence on a mobile operating system of the mobile computing device based on the second location of the mobile computing device; and receiving, with the mobile app executing on the mobile computing device, notification from the mobile operating system that the mobile computing device has crossed the third geo-fence, even where the mobile app is suspended or not running.

5. The method of claim 1, further comprising:
calculating a velocity of the mobile computing device based on a first time receiving a first location, and a second time receiving a second location; and
determining a geo-fence size based on the velocity, wherein a geo-fence is based on the geo-fence size.

6. The method of claim 1, further comprising determining a geo-fence size based on a time of day, wherein a geo-fence is based on the geo-fence size.

7. The method of claim 1, further comprising determining a geo-fence size based on a predefined place associated with the location of the mobile computing device, wherein a geo-fence is based on the geo-fence size.

8. The method of claim 1, further comprising determining a geo-fence size based on a battery preservation setting, wherein a geo-fence is based on the geo-fence size.

9. The method of claim 1, further comprising generating a map based on a plurality of locations of the mobile computing device over a period of time.

10. The method of claim 9, wherein the map comprises a route and velocity indicator of the mobile computing device.

11. The method of claim 9, wherein the map comprises a location and duration indicator of the mobile computing device.

12. The method of claim 1, further comprising:
receiving from a map interface parameters defining a geographical area;
setting a static geo-fence associated with the geographical area on the mobile operating system to notify the mobile app when the static geo-fence is crossed by the mobile computing device;
receiving notification from the mobile operating system that the mobile computing device has crossed the static geo-fence; and
sending an alert message to notify a responsible party.

13. The method of claim 1, further comprising:
storing a plurality of historical locations of the mobile computing device over a period of time;
determining patterns associated with the stored historical locations;
receiving one or more recent locations of the mobile computing device;
detecting an anomaly based on the one or more recent locations and the determined patterns of the mobile computing device; and
sending an alert message to notify a responsible party.

14. A computer system for performing dynamic location tracking, the computer system comprising:
system memory;
a geo-fence module residing in the system memory, the geo-fence module being programmed to set, with a mobile application ("app") executing on a mobile computing device, a first geo-fence of a first predefined size on a mobile operating system of the mobile computing device to notify the mobile app when the first geo-fence is crossed by the mobile computing device, even where the mobile app is suspended or not running, wherein the first predefined size comprises a center location and a radius, and is based on at least one of: a current velocity of the mobile computing device, a current time of day, a current battery preservation setting of the mobile computing device, and a current location of the mobile computing device, the geo-fence module being further programmed to set, with the mobile app executing on the mobile computing device, a second geo-fence of a second predefined size on the mobile operating system of the mobile computing device based on a received location of the mobile computing device, to notify the mobile app when the second geo-fence based on the received location is crossed by the mobile computing device, even where the mobile app is suspended or not running, wherein the second predefined size comprises a center location and a radius, and is based on at least one of: a current velocity of the mobile computing device, a current time of day, a current battery preservation setting of the mobile computing device, and a current location of the mobile computing device;

a notification module residing in the system memory, the notification module being programmed to receive, with the mobile app executing on the mobile computing device, notification from the mobile operating system that the mobile computing device has crossed the first geo-fence, wherein prior to receiving notification from the mobile operating system the mobile app is stopped, terminated, suspended, or otherwise not running to preserve battery life on the mobile computing device;

a location module residing in the system memory, the location module being programmed to receive, with the mobile app executing on the mobile computing device, the location of the mobile computing device;

a detection module residing in the system memory, the detection module being programmed to detect, with the mobile app executing on the mobile computing device, an action taken with the mobile computing device; and a sending module residing in the system memory, the sending module being programmed to send, with the mobile app executing on the mobile computing device, an alert message to notify a responsible party based on the detected action; and at least one processor configured to execute the modules.

15. The computer system of claim 14, wherein the mobile operating system is iOS.

16. The computer system of claim 14, wherein prior to receiving notification from the mobile operating system the mobile app is stopped, terminated, suspended, or otherwise not running.

17. The computer system of claim 16, wherein subsequent to setting a geo-fence the mobile app is woken up, relaunched or started by the mobile operating system.

18. At least one non-transitory computer readable-storage medium for dynamic location tracking, the at least one non-transitory computer readable-storage medium storing computer executable instructions that, when loaded into computer memory and executed by at least one processor of a computing device, cause the computing device to:

set, with a mobile application ("app") executing on a mobile computing device, a first geo-fence of a first predefined size on a mobile operating system of the mobile computing device to notify the mobile app when the first geo-fence is crossed by the mobile computing device, even where the mobile app is suspended or not running, wherein the first predefined size comprises a center location and a radius, and is based on at least one of: a current velocity of the mobile computing device, a current time of day, a current battery preservation setting of the mobile computing device, and a current location of the mobile computing device;

receive, with the mobile app executing on the mobile computing device, notification from the mobile operating system that the mobile computing device has crossed the first geo-fence, wherein prior to receiving notification from the mobile operating system the mobile app is stopped, terminated, suspended, or otherwise not running to preserve battery life on the mobile computing device;

receive, with the mobile app executing on the mobile computing device, a location of the mobile computing device;

set, with the mobile app executing on the mobile computing device, a second geo-fence of a second predefined size on the mobile operating system of the mobile computing device based on the received location of the mobile computing device, to notify the mobile app when the second geo-fence based on the received location is crossed by the mobile computing device, even where the mobile app is suspended or not running, wherein the second predefined size comprises a center location and a radius, and is based on at least one of: a current velocity of the mobile computing device, a current time of day, a current battery preservation setting of the mobile computing device, and a current location of the mobile computing device;

detect, with the mobile app executing on the mobile computing device, an action taken with the mobile computing device; and send, with the mobile app executing on the mobile computing device, an alert message to notify a responsible party based on the detected action.

* * * * *